United States Patent [19]

Bajorek et al.

[11] 3,840,898

[45] Oct. 8, 1974

[54] SELF-BIASED MAGNETORESISTIVE SENSOR

[75] Inventors: Christopher H. Bajorek, Lewisboro; Lubomyr T. Romankiw, Briarcliff Manor; David A. Thompson, Somers, all of N.Y.

[73] Assignee: International Business Machines Corporation, Armonk, N.Y.

[22] Filed: Dec. 29, 1972

[21] Appl. No.: 319,131

[52] U.S. Cl. .................. 360/113, 360/66, 360/121, 360/125

[51] Int. Cl. .......................... G11b 5/30, G11b 5/44

[58] Field of Search .......... 179/100.2 CH, 100.41 T; 324/46; 340/174 EB; 338/32; 360/113, 66, 121, 125

[56] References Cited

UNITED STATES PATENTS

| | | | |
|---|---|---|---|
| 2,712,601 | 7/1955 | Reinwald | 179/100.2 CH |
| 3,016,507 | 1/1962 | Grant et al. | 338/32 R |
| 3,256,483 | 6/1966 | Broadbent | 324/46 |
| 3,493,694 | 2/1970 | Hunt | 179/100.2 CH |
| 3,493,943 | 2/1970 | Raffel | 340/174 EB |
| 3,568,180 | 3/1971 | Rosch | 179/100.2 CH |
| 3,731,007 | 5/1973 | Masuda et al. | 179/100.2 CH |

*Primary Examiner*—Alfred H. Eddleman
*Attorney, Agent, or Firm*—George Baron; Graham S. Jones, II

[57] ABSTRACT

For high density recording (more than 2000 bits per inch) and magnetic bubble sensing, magnetoresistive heads are being used. To operate them most efficiently, the heads are biased about the most linear range of the R-H plot of the magnetoresistive sensor of the head. Provision is made to have such biasing means be an integral part of the transducer so as to permit one to fabricate miniature sensors.

15 Claims, 11 Drawing Figures

SELF-BIASED MAGNETORESISTIVE SENSOR

BACKGROUND OF THE INVENTION

Whereas magnetic sensing devices using a magnetoresistive element as the sensing element or transducer are known, see U.S. Pat. No. 3,493,694 to R. P. Hunt or R. P. Hunt's paper "A Magnetoresistive Readout Transducer" which appeared in the 1971 issue of the "IEEE Transactions on Magnetics", Page 150, MAG-7, and U.S. Pat. No. 3,691,540 to G. Almasi et al., such transducers can be used efficiently if the sensing element is magnetically biased in the linear region of its resistance versus magnetic field plot. While the Hunt patent cited above employs magnetic biasing, he does so using external biasing structures, i.e., a permanent magnet or an electromagnet separate and apart from the sensing element. Additionally, an unshielded magnetoresistive sensing head has, in general, low resolution. The presence of both shielding and external biasing means, per force, result in a recording device that is too large to be compatible with high density recording head miniaturization and batch fabrication techniques. Shielding also inherently limits the ability to apply an externally provided bias field.

In those applications where it is desirable to achieve maximum sensitivity and/or obtain bipolar output voltages or currents from a magnetoresistive sensor, the sensor is biased about its most linear operating range with a constant field which is superimposed upon a time varying sense field. All known biasing means have been made independently of the magnetoresistive sensor resulting in either a large number of manufacturing steps or a complex structure to achieve such bias. The present invention, however, fabricates the means that biases the magnetoresistive element at its most linear operating range as a permanent magnet that is intrinsic to, or an integral part of, the magnetoresistive element itself. This accomplishes many desirable features at once, namely, simplification in structure and fabrication of the sensing and biasing elements, an increase in reliability of the magnetoresistive sensor, maximum sensing efficiency, and a miniaturization of the device that includes such integral sensing device. The utility of the invention is greatly enhanced by the property that the magnetoresistive strip and the bias structure can be defined in the same photolithographic step. This eliminates the extreme alignment tolerances and highly selective etching techniques which would be required if they were delineated in separate etching processes. In addition, the details of the biased magnetization distribution in the strip are different for the external bias of Hunt and for the structures of this invention, resulting in improved performance for such structures.

SUMMARY OF THE INVENTION

The basic concept of making the magnetic biasing means integral with the magnetoresistive sensor is implemented in many ways. One structure comprises fabricating a thin film of permanently magnetized material on a substrate of glass, followed by the deposition of an insulating layer which accommodates a subsequently deposited magnetoresistive sensor. The permanent magnet layer is made of hard magnetic material which biases the magnetoresistive layer. Another embodiment employs a permanently magnetic layer that is adjacent to and coplanar with a magnetoresistive layer wherein the magnet applies the needed magnetic bias to the magnetoresistive layer.

One way to achieve a magnetoresistive sensor wherein the magnetoresistive sensing element is integral with its biasing element is to change the magnetic properties of a nickel-iron film in portions of that film. Preferential oxidation of iron is used to change the magnetic properties of the nickel-iron film in order to change its coercivity. Thus a high coercivity film serves as the biasing film that is adjacent to and coplanar with the untreated film that serves as the magnetoresistive, low coercive sensor.

Yet another way to achieve a sensing element integral with its biasing element is to effect an exchange interaction between two materials and employ exchange coupling alone or exchange coupling and demagnetizing effects for use as biasing techniques. Positive or negative displacement of the hysteresis loop of a magnetic material results if the coercivity of the coupling film is greater than the coercivity of the magnetoresistive sensor. Wherever the magnetic bias is provided, it can be provided either along a predetermined axis such as the hard or easy axis of the magnetoresistive sensor. An important object of this invention is to fit more heads close together, with narrower heads providing greater rates of reading of data stored in a more compact form.

A second important object of this invention is to provide the combination of shielding of heads and smallness of heads permitting fitting of the heads closer together, so that narrower recording tracks can be used.

The foregoing and other objects, features, and advantages of the invention will be apparent from the following more particular description of the preferred embodiments of the invention as illustrated in the accompanying drawings.

DETAILED DESCRIPTION OF THE INVENTION

Figure 7:
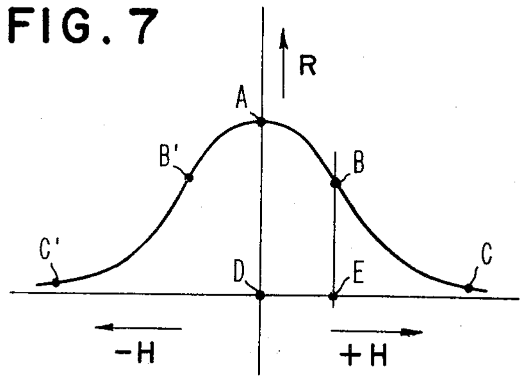
FIG. 7 is a normal R-H plot of a magnetoresistive material.

In FIG. 7 is shown a plot of how a permalloy material made of Ni-Fe, Ni-Co, Ni-Fe-Co, and the like, of low coercivity, will have its resistance change as a function of magnetic field applied to it. It is seen, that if a positive field +H is applied to such a magnetoresistive material, the resistance of the latter will traverse a path similar to the curve ABC. If a negative field −H is applied, the curve follows the path shown by the route AB'C'. If the chosen magnetoresistive material is magnetically biased at point B, which is within the linear portion of the curve, then small positive or negative magnetic excursions from starting point E could be readily discriminated. Since, in the making of magnetic sensing heads capable of sensing data stored at more than 2000 bits per inch, size is of the essence, it becomes imperative to make both the biasing means and the sensing means as small as possible.

Figures 1, 2:
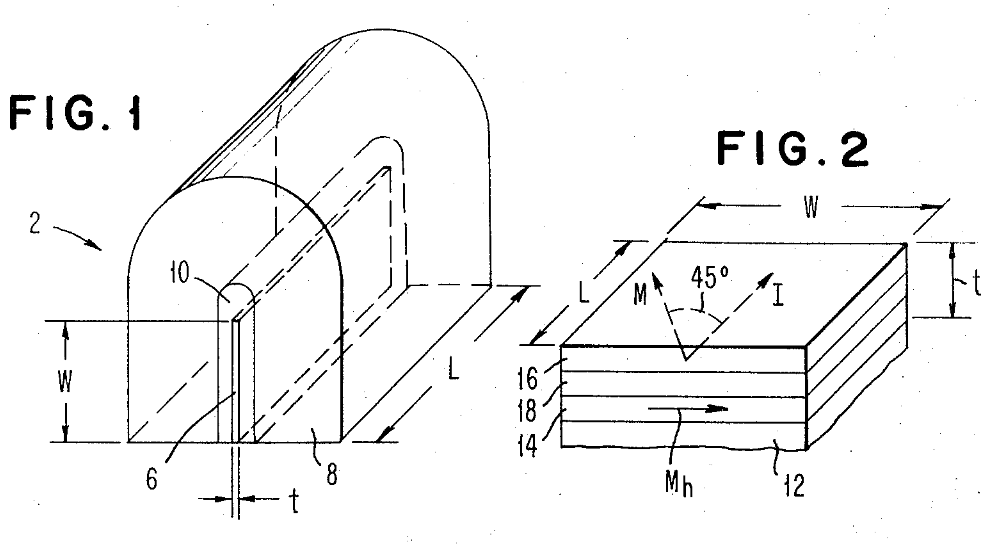
FIG. 1 is the type of a shielded thin film recording head structure to which the present invention applies.
FIG. 2 is one embodiment of a magnetoresistive strip used in a head of the type shown in FIG. 1.

FIG. 1 shows the self-biased magnetoresistive sensor 6 of this invention enclosed in a magnetic shielding structure 8, which essentially determines its resolution as a recording head. The self-biased sensor 6 is itself a composite structure, which is explained in conjunction with FIGS. 2–6. The material 10 separating the sensor 6 from the shield 8 will ordinarily include the substrate 12 in FIGS. 2, 3, and 6.

FIG. 2 illustrates an example of the invention wherein one builds up on a substrate 12, which could be $SiO_2$, glass, photoresist material or any other non-magnetic and inert material optionally deposited over a magnetic shield, a thin layer 14 of a material that serves effectively as a permanent magnet. Such thin layer 14 must have a high coercive field that is in excess of the maximum stray or data-bearing fields produced by a magnet storage medium, not shown. Such storage medium could be a tape, disc, magnetic ink, a sheet capable of generating and transporting bubble domains, and the like. The high coercivity film 14 will always maintain its magnetization $M_h$ in the direction shown by the corresponding arrow. Examples of suitable hard layers are Co-P and $Fe_3O_4$. A magnetoresistive strip or sensor 16, separated by an insulated layer 18, lies adjacent to the biasing strip 14 and is influenced by it, such that its magnetization, which would otherwise lie along the easy axis direction of film 16, parallel to the sense current I, is rotated within the plane of film 16 through an angle $\theta$=45° by the demagnetizing field of film 14. Such rotation of the magnetization of the magnetoresistive strip 16 by permanent magnet 14 effectively biases such strip 16 near point B of the R-H plot of FIG. 7.

Representative thicknesses for the various components of the novel transducer are as follows:

Substrate 12 has any arbitrary thickness
Biasing Magnetic Strip 14 is 200A–2000A
$SiO_2$ Insulation 18 is 500–5000A
Magnetoresistive Strip 16 is 50–400A.

For purposes of maintaining a miniaturized head or transducer, the $SiO_2$ layer 18 should be as thin as possible, perhaps 300–500A, and depending on the detailed structure, consistent with good electrical insulation and/or exchange decoupling.

Figure 6:
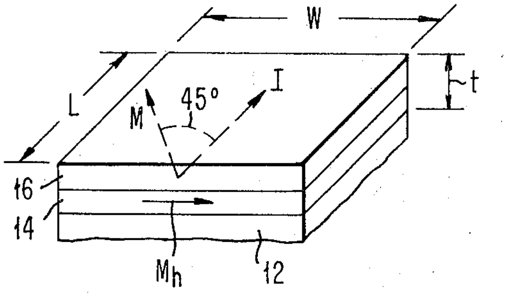

The materials 14, 16 and 18 that make up this self-biasing magnetoresistive sensor can be evaporated, sputtered, electroplated or fabricated using equivalent techniques. Film 14 is normally a metal because metals are high magnetic moment materials, so that an insulator should separate the magnetoresistive element 16 from the biasing strip 14. It is within the purview of this invention to employ magnetized ferrites as the biasing strip 14 in that such ferrites are poor electrical conductors so that the magnetized ferrite can be essentially in electrical contact with the magnetoresistive strip 16, thus avoiding the need for electrically insulating layer 18. FIG. 6 illustrates the invention when layer 14 is both magnetic and electrically insulating. Although the two layers 14 and 16 are shown to be in direct contact, the fabrication process may be adjusted so that there is a magnetically inert layer of at least a few atomic layers in thickness at the interface to prevent exchange coupling between the two layers 14 and 16. However, compared to the thickness required for reliable electrical insulation, such a spacer has negligible thickness. For compactness, poorly conducting permanent magnets are preferred provided their magnetic moments are high enough to bias the magnetoresistive strip 16 close to point B of the curve of FIG. 1. Also within the purview of this invention is the fact that the positions of films 14 and 16 can be interchanged so long as the storage medium is located with respect to the integrated head or transducer so that the information bearing stray field of the storage medium rotates the magnetic moment of the magnetoresistive film 16.

Although elsewhere in this specification we speak as if the magnetic bias produced on the magnetically soft layer by the hard layer is a magnetostatic interaction; it is within the purview of this invention that the bias may be due to an exchange interaction between the two layers. This type of bias can appear if there is direct atomic contact between the layers, as in FIG. 6, or if there is a distribution of pinholes in the separating layer 18 (See FIG. 2).

In addition to the use of an exchange interaction for directly biasing the magnetoresistive element, it is also possible to utilize exchange effects within a composite hard layer to obtain the desired hardness.

Figure 3:
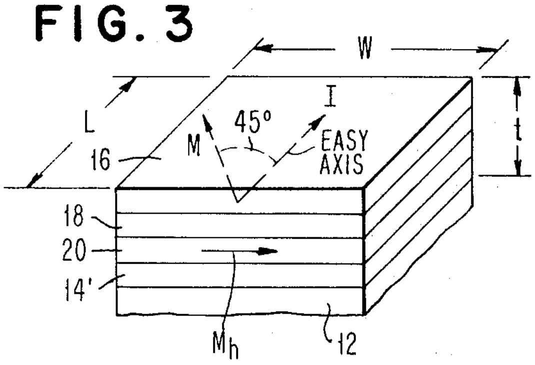
FIGS. 3–6 are yet other embodiments of the invention shown in FIG. 2.

In FIG. 3, the invention is modified in a manner whereby a material, not basically permanently magnetic, can be modified in thin film form so that it can serve as the permanent built-in magnet 14 of FIGS. 2 and 6. A layer 14' composed of an antiferromagnetic material such as $\alpha Fe_2O_3$ is deposited on a glass substrate 12 and a soft magnetic material 20, e.g., Ni-Fe, is evaporated onto the $Fe_2O_3$ in the presence of a strong magnetic field. Due to the phenomenon of exchange coupling, the combined film composed of antiferromagnetic layer 14' and soft magnetic material Ni-Fe makes the latter magnetically "hard" or highly coercive. For the purpose of appreciating the operation of the present reading head, "hard" means that the magnetizing film 14 or its equivalent (14'-20) remains constantly magnetized in the same direction in the presence of all magnetic fields which such film will experience during the normal operation of the built-in bias reading strip 16. Thus, coercivities of 100 Oe may be "hard" in some applications, whereas in other applications one can not tolerate a coercivity of less than 600 Oe for the permanent magnet.

After the hard biasing magnet 20-14' is produced, the magnetoresistive sensing element 16 is placed over it with the insulating layer 18 interposed between them. The device of FIG. 3 may be of particular advantage where the thin film sensor 16 must be constructed to be compatible with a component-carrying base which is antiferromagnetic and that portion of the base which is to be used for supplying the magnetic bias to strip 16 can be selectively treated with a soft magnetic material that can become hard by the process of exchange coupling. In effect, the soft magnet material (Ni-Fe or the like) is atomically coupled to the topmost layer of the antiferromagnetic material 14' and assumes the direction of magnetism of that layer.

Representative, though not complete, examples of the use of the phenomenon of exchange coupling for converting low coercivity materials into high coercivity materials are: deposition of Ni-Fe on $\alpha Fe_2O_3$ or $\alpha Fe_2O_3$ on Ni-Fe. For instance, when Ni-Fe is deposited on $Fe_2O_3$, the coercivity of Ni-Fe changes from a value of 5 Oe to a value of 200 Oe. In the above examples, the deposited layer which has a relatively low coercivity assumes a higher coercivity through an exchange interaction with the substrate material receiving the deposited layer.

There is another interaction between two layers which can be used to obtain a high coercivity. When a thin film is deposited upon a material with somewhat different atomic spacing distances, the strain and distortions which result at the interface can greatly increase the magnetic coercivity of the layers. For example, Co or Co rich Ni-Co alloys, when deposited on Va or Cr underlayers, can achieve coercivities as high as 800 Oe. In this case, layer 14' of FIG. 3 would be Va or Cr and layer 20 of FIG. 3 would be Co or Ni-Co.

In all of the above examples, the various layers 14, 18, 20 etc. may be deposited as whole sheets, and the complete multi-layer biased strip etched out at one time. This is extremely advantageous when compared to fabrication schemes in which a very small magnetoresistive strip must be etched in exact registration with some otherwise delineated small magnetic bias structure.

Figure 4:
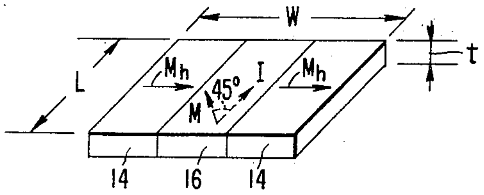

In FIG. 4, the magnetically biased magnetoresistive strip 16 is achieved by beginning with a permalloy strip sensor 16 that has a width W and preferentially oxidizing both side portions 14—14 of such strip 16 so that they become hard magnets, i.e., they have high coercivities while the unoxidized central portion remains soft. The arrows indicate the direction of magnetization within the soft and hard regions during use.

Figure 5:
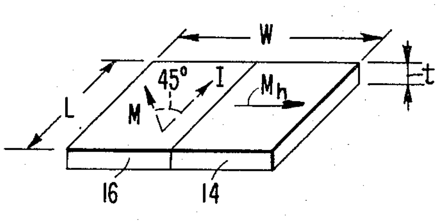

In FIG. 5, the invention can be practiced with only one side of the magnetoresistive sensing strip 16 being magnetically biased by one high coercive layer 14. In this instance, so long as such single layer 14 has a high enough coupling field to bias strip 16 and its coercivity is high, one bias strip can be used instead of the two of FIG. 4.

A method for achieving the embodiments of the invention shown in FIGS. 4 and 5 is taught in a paper by C. H. Bajorek et al. entitled "Preferential Oxidation of Fe in Permalloy Films" which appeared in the Aug. 15, 1971 issue of Applied Physics Letters. The thermal and temporal control of the degree of preferential oxidation of Fe in a Ni-Fe alloy film allows one to control the coercive field $H_c$, the anisotropy field $H_k$ and the saturation magnetization M over large ranges. The teaching of the above-noted Applied Physics Letters article is exploited to construct the self-aligned bias structures of FIGS. 4 and 5.

The oxide layer on the surface of an oxidized Ni-Fe film is predominantly Fe-oxide. The oxidation of such a Ni-Fe film results in a depletion of Fe from the bulk of the film so as to effectively change its composition. Since the values of M, $H_c$ and $H_k$ of Ni-Fe films are composition dependent, a change in the degree of oxidation can be used to control the above parameters. For example, $H_k$ for Ni-Fe films changes gradually with composition where the Ni content is in excess of 80 percent and reaches a minimum when the composition is in the vicinity having 90 percent nickel. On the other hand, $H_c$ and M are strong functions of composition. By varying the Ni content from 80 percent to 100 percent, $H_c$ monotonically increases from less than 1 Oe. to more than 100 Oe. while M decreases from 800 Gauss to 480 Gauss. Another peculiarity of Ni-Fe films is that for a Ni content in excess of 80 percent, $H_c$ is also dependent on the thickness of the Ni-Fe film.

Thus, to achieve the films of FIG. 4 or FIG. 5, for example, a permalloy film 16 is deposited on a substrate not shown, and a protective coating of photoresist is deposited over a preselected portion of the permalloy film. By annealing the above-structure at elevated temperatures in an oxygen rich atmosphere, only the unprotected portion 16 of the permalloy film will be oxidized. The unprotected portion of the permalloy is annealed at elevated temperatures in an oxygen rich atmosphere whereby $H_c$, $H_k$ and M are modified in accordance with the degree of oxidation. The oxidation serves the dual role of making the oxidized portion of magnetoresistive strip 16 both magnetic and non-conducting so that there is no need to place an insulator between sensing strip 16 and hard magnet 14.

Other treatments can have the same effect of raising the coercivity as does oxidation. Chlorides, sulfates and other compounds will produce this effect through chemical action. Etchants could do so by roughening the surface. It can also be achieved by selective deposition of materials which exchange couple to the layer.

FIG. 5 shows how a magnetoresistive strip 16 can be biased by the application of a field from one edge only. Although the uniformity of bias across the strip 16 is not as satisfactory as in the other examples given, it might be a reasonable choice for the case of a vertical recording head or transducer, where the lower edge of the magnetoresistive strip 16 must be as close to the recording medium as possible. That lower edge may even be determined by the final grinding of the face of the head structure.

Similar reasoning applies to the biased structure of FIGS. 2, 3, 4, and 6. Although in the figures we have shown the edges of the biasing layers exactly coincident with the edges of the magnetoresistive strip 16, and this leads to a superior bias magnetization configuration, as well as being easy to achieve, nevertheless exact coincidence of one or both edges is not required. The biasing and insulating layers could even extend an infinite extent to one side of the strip 16, provided that the biasing action is obtained at the other edge or from exchange coupling over the interface area. This sort of structure might be advantageous, for example, when there is no suitable etching technique for one of the layers and one edge will have coincidence anyway through grinding.

In the making of the self-aligned magnetically biased magnetoresistive sensors shown and described herein, the magnetic bias field for operation at the point B shown in FIG. 7 is parallel to the sense field, or perpendicular to the direction of sense current. However, to avoid what is termed the Barkhausen Effect in magnetic sensing, it is desirable that the magnetic field of the permanent magnet 14 be oriented so that one component of such permanent field M be parallel to the sense current direction in strip 16 and one component be perpendicular to that sense current direction. It is the bias field that is parallel to the sense current direction which assists in diminishing the detrimental domain wall switching mechanism (called the Barkhausen Effect) in the magnetoresistive sensor 16.

The magnetoresistive strip will ordinarily be composed of a material such as permalloy, which can be fabricated with uniaxial anisotropy, synonymous with an easy axis direction. The magnetic state of the strip in the absence of any signal from the medium is determined by this intrinsic anisotropy, by shape anisotropy, and by the easy and hard axis biases. The latter effects can be designed so as to compensate for a particular intrinsic anisotropy. Hence, the easy axis direction is not constrained to lie along the current direction. In addition, it is possible to use isotropic magnetoresistive materials, $H_k=0$, and still practice this invention.

It is the present technique of making the sensing heads of FIGS. 2–6 herein that allows one to use powerful magnets, after the heads have been made, to finally orient the bias field M at any desired angle from 0 to 180°. This feature makes the invention herein particularly desirable in that current-carrying films are used in the prior art to bias a sensing element, but such current-carrying films are not amenable to achieving such arbitrary orientation of the biasing field.

Figure 8:
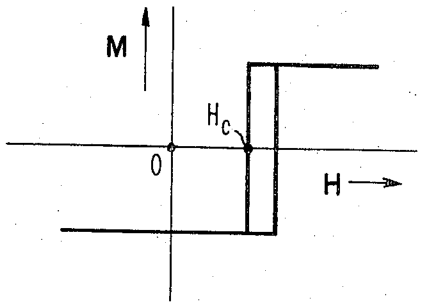
FIG. 8 is a hysteresis plot of that embodiment of the invention using exchange coupled films to achieve bias in a magnetoresistive loop.

When a hard magnetic film is produced by the process of exchange interaction between two materials, such as materials 14' and 20 described in FIG. 3, such exchange coupling results in several effects that become useful for the biasing of very thin film sensors. In some cases, the resulting composite film has a magnetization curve (B-H loop) which is normal in appearance, but with a large coercive force ($H_c$). In other cases the antiferromagnetic material 14', when soft permalloy is deposited thereon, will displace the hysteresis loop of the permalloy. In effect, FIG. 8 indicates that the combined film 14'-20 will produce the displaced hysteresis loop of FIG. 8 wherein stray fields less than $H_c$ will not switch "soft" layer 20. So if the stray fields being sensed by magnetoresistive film 16 never reach $H_c$, then such combined film 14'-20 behaves as a hard magnet, biasing such strip 16.

Figure 10A:
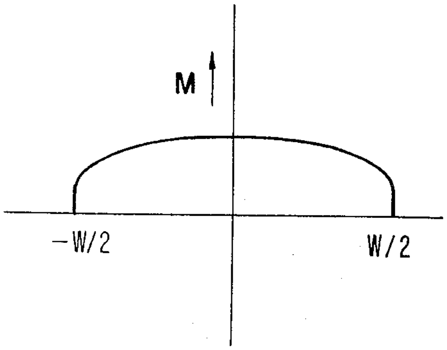
FIGS. 10A and 10B are plots of M within the sensor for comparing prior art self-biasing means with that of the invention.
Figure 10B:
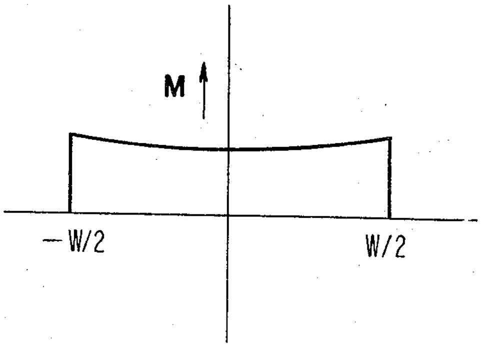

FIG. 10A is a plot of the distribution of the magnetization component along the sense field direction across the sensor of width W for the case when the sensing element is enclosed in a uniform bias field. Due to demagnetizing effects, the edges of the sensing element are not biased, resulting in operation of portions of the sensing element at a point other than near B in FIG. 7. FIG. 10B represents a plot of this distribution for the present invention showing that the sensing strip 16 is uniformly biased throughout the width of the strip so that strip 16 is everywhere biased at a linear portion of the B-H curve of FIG. 7 and consequently maximizes the efficiency of the sensor.

Figure 9:
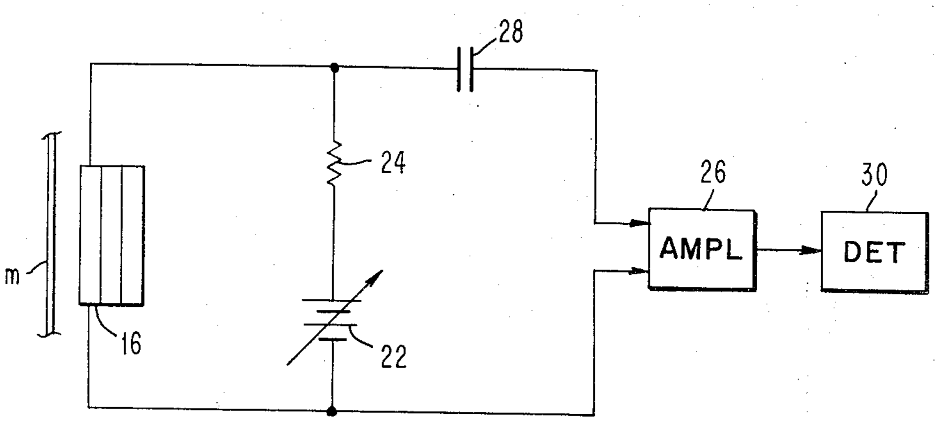
FIG. 9 is a schematic showing of how the novel reading head is used in a reading circuit.

FIG. 9 is a schematic showing of how the novel thin film having self-aligned magnetic biasing means is used to sense magnetically stored information in a magnetic storage medium m. The thin film head, which can be made in any of the embodiments shown and described, shows the magnetically biased sensing element 16 in magnetic-sensing relationship with storage medium m. Battery 22 supplies, through resistor 24, the sense I current to the magnetoresistive element 16. When there is a change of resistance ΔR in sensing strip 16 because of the flux in storage medium m being sensed by such strip 16, a voltage signal IΔR is produced, which signal is coupled to amplifier 26 through capacitor 28 and the amplified voltage signal is detected by detector 30.

In the case of magnetic bubble sensing, the biased magnetic strips described above for magnetic recording application may be used essentially unchanged. For example, the sensor structure of FIGS. 2–6 may be substituted for element 16 of FIG. 1 of U.S. Pat. No. 3,691,540, cited hereinabove. Here the ability to bias the element in an arbitrary direction in the plane of the film is useful in maximizing the sensitivity of the element in the presence of any particular bubble propagation structure.

To summarize, prior art magnetoresistive sensing strips are biased by having them immersed in a uniform bias field or field from an adjacent current conductor. However, such bias fields give rise to nonuniform magnetization of the sensing strip due to the demagnetizing fields at the edges of the sensing strip. At the edges of the sensor, the transverse magnetization goes to zero. In this invention, the bias due to the self-aligned bias means provides larger magnetization at the edges of the magnetoresistive sensor 16 so that a more uniform bias, than that of prior art schemes, is attained. Additionally, the novel bias means shown and described herein avoids the power requirements and attendant power dissipation problems that arise when current-carrying bias means are used, such power dissipation problems becoming almost insurmountable where thin film technology is employed to make the reading head. Finally, the structures of this invention are inherently self-aligning and thus do not require a precise alignment operation for producing registration between the magnetic bias means and the magnetoresistive element.

What is claimed is:

1. In a magnetic transducer having a thin film layer magnetoresistive strip in magnetic-coupling relationship with the magnetized data of a storage medium, a magnetically hard, permanently magnetized, thin film layer parallel to the plane of said magnetoresistive strip constantly magnetized in the same direction when exposed to magnetic fields below a predetermined level, adjacent to said magnetoresistive strip for applying a permanent magnetic bias to said strip, said applied bias being along a predetermined direction in the plane of said magnetoresistive strip.

2. In a magnetic transducer having a thin film layer magnetoresistive strip in magnetic-coupling relationship with the magnetized data of a storage medium, an insulating layer on said strip and a magnetically hard permanently magnetized thin film layer parallel to the plane of said magnetoresistive strip on said insulating film for applying a permanent magnetic bias to said strip, said applied bias being along a magnetization axis of said strip.

3. The invention of claim 2 wherein said magnetoresistive strip is of the order of 50–400A, said insulating layer of the order of 300–1000A and said magnetically hard film is of the order of 200–1000A.

4. In a magnetic transducer including a thin film layer magnetoresistive strip as the magnetic data sensing element of said transducer, a treated portion of said strip being selectively treated to be permanently magnetized, said treated portion of said sense strip being coplanar with said untreated portion and said treated portion serving as a biasing magnet for said untreated portion.

5. In the transducer of claim 4 wherein said highly coercive treated portion of said strip applies a magnetic bias that is at right angles to the length of said magnetoresistive strip.

6. A magnetic transducer including a thin film magnetoresistive strip as the magnetic data sensing element of said transducer, a thin film electrically insulating layer on said strip, and a thin film highly coercive permanently magnetized magnetic layer on said insulating layer for applying a magnetic bias at any angle to the length of said strip, said highly coercive permanent magnetic layer being composed of coupled films wherein a soft magnetic layer is atomically coupled to a hard permanent magnetic layer so as to assume its high coercivity.

7. The transducer of claim 6 wherein said exchange coupled films consist of Ni-Fe deposited on $\alpha Fe_2O_3$.

8. The transducer of claim 6 wherein said exchange coupled films consist of $\alpha Fe_2O_3$ deposited on Ni-Fe.

9. The transducer of claim 6 wherein the hard film consists of Co deposited on vanadium.

10. The transducer of claim 6 wherein the hard film consists of Co deposited on chromium.

11. The transducer of claim 6 wherein said exchange coupled films consist of Ni-Co deposited on vanadium.

12. The transducer of claim 6 wherein said exchange coupled films consist of Ni-Co deposited on chromium.

13. The transducer of claim 7 wherein said exchange coupled films consist of binary Co-P.

14. In a transducer including a thin film magnetoresistive strip as the magnetic data sensing element of said transducer, two portions on opposite sides of an untreated portion of said magnetoresistive strip being treated to provide respective permanent magnetic coercivities much higher than the untreated portion of said strip, said highly coercive portions supplying a hard, permanent magnetic bias in a direction to said untreated sense strip, said two biasing magnetic portions and said untreated magnetoresistive strip being coplanar.

15. In a transducer having a thin film sensing strip, said thin sensing strip being a magnetoresistive layer, and a hard, permanently magnetized thin film layer integral with said strip for applying magnetic bias to said strip, said permanently magnetized thin film layer being disposed relative to said strip such that a first vector perpendicular to the plane of said strip and a second vector perpendicular to the plane of said permanent magnet layer are substantially parallel and such that at least one edge of said permanent magnet layer is in close proximity with and substantially parallel to one edge of said strip for applying magnetic bias to said strip.

* * * * *